US010110551B1

(12) United States Patent
Toghraee

(10) Patent No.: US 10,110,551 B1
(45) Date of Patent: Oct. 23, 2018

(54) COMPUTER-IMPLEMENTED SYSTEM AND METHODS FOR PROVIDING IPOE NETWORK ACCESS USING SOFTWARE DEFINED NETWORKING

(71) Applicant: Reza Toghraee, London (GB)

(72) Inventor: Reza Toghraee, London (GB)

( * ) Notice: Subject to any disclaimer, the term of this patent is extended or adjusted under 35 U.S.C. 154(b) by 2 days.

(21) Appl. No.: 15/676,480

(22) Filed: Aug. 14, 2017

(51) Int. Cl.
*H04L 29/12* (2006.01)
*H04L 12/24* (2006.01)
*H04L 29/06* (2006.01)

(52) U.S. Cl.
CPC .......... *H04L 61/103* (2013.01); *H04L 41/12* (2013.01); *H04L 61/2015* (2013.01); *H04L 61/6022* (2013.01); *H04L 63/0876* (2013.01); *H04L 63/10* (2013.01)

(58) Field of Classification Search
CPC ... H04L 61/103; H04L 61/2015; H04L 41/12; H04L 61/6022; H04L 63/0876; H04L 63/10
See application file for complete search history.

(56) References Cited

U.S. PATENT DOCUMENTS

| 7,742,429 | B1 * | 6/2010 | Huang | H04L 29/06027 |
| | | | | 370/254 |
| 9,197,498 | B2 | 11/2015 | Chambers et al. | |
| 9,521,033 | B2 | 12/2016 | Madem et al. | |
| 2003/0211839 | A1 * | 11/2003 | Baum | H04L 29/12018 |
| | | | | 455/403 |
| 2004/0049570 | A1 * | 3/2004 | Frank | G01S 5/0252 |
| | | | | 709/223 |
| 2005/0080909 | A1 * | 4/2005 | Panasyuk | G06F 21/31 |
| | | | | 709/229 |
| 2005/0265364 | A1 * | 12/2005 | Gallatin | H04L 12/4645 |
| | | | | 370/401 |
| 2007/0223470 | A1 * | 9/2007 | Stahl | H04L 41/00 |
| | | | | 370/389 |
| 2010/0054260 | A1 * | 3/2010 | Pandey | H04L 49/00 |
| | | | | 370/395.53 |
| 2011/0035494 | A1 * | 2/2011 | Pandey | G06F 9/5077 |
| | | | | 709/224 |

(Continued)

*Primary Examiner* — Jenee Holland
(74) *Attorney, Agent, or Firm* — PatentFile, LLC; Bradley C. Fach; Steven R. Kick

(57) ABSTRACT

A computer implemented system for providing IPoE network access using software defined networking may include one or more: consumer perimeter equipment (CPE) devices; layer 2 non-channelized media that may be a programmable transit switch in communication with the CPE device; and layer 3 non-channelized media that may be a programmable transit switch in communication with the layer 2 non-channelized media comprising a programmable transit switch. A Subscriber Controller Server may be in communication with the layer 3 non-channelized media comprising a programmable transit switch. The Subscriber Controller Server may be configured to authenticate the CPE device via an enrollment request received from the CPE device, and configured to program the layer 2 programmable transit switch to map the Media Access Control (MAC) address of the CPE device to a port of the layer 2 programmable transit switch, and configured to program the layer 3 programmable transit switch to map the MAC address of the CPE to an Internet Protocol address of the CPE device.

20 Claims, 8 Drawing Sheets

(56) References Cited

U.S. PATENT DOCUMENTS

| | | | |
|---|---|---|---|
| 2012/0014383 A1* | 1/2012 | Geromel | H04L 29/12028 370/352 |
| 2012/0075998 A1* | 3/2012 | Shah | H04L 12/185 370/237 |
| 2012/0324442 A1* | 12/2012 | Barde | H04L 49/70 718/1 |
| 2013/0188514 A1* | 7/2013 | Jain | H04L 41/042 370/254 |
| 2015/0312156 A1* | 10/2015 | Kitada | H04L 43/0882 370/235 |
| 2015/0317169 A1* | 11/2015 | Sinha | H04L 49/254 713/2 |
| 2016/0156629 A1* | 6/2016 | Yasaki | G06F 13/102 726/4 |
| 2016/0191308 A1* | 6/2016 | Berry | H04L 41/0806 709/221 |
| 2016/0330080 A1* | 11/2016 | Bhatia | H04L 41/12 |
| 2016/0359891 A1* | 12/2016 | Pang | H04L 63/1425 |
| 2017/0054646 A1* | 2/2017 | Kitada | H04L 47/32 |
| 2017/0093739 A1* | 3/2017 | Kitada | H04L 47/2441 |
| 2018/0091384 A1* | 3/2018 | Charnock | H04L 41/0883 |
| 2018/0123873 A1* | 5/2018 | Li | H04L 41/00 |

\* cited by examiner

COMPUTER-IMPLEMENTED SYSTEM AND METHODS FOR PROVIDING IPOE NETWORK ACCESS USING SOFTWARE DEFINED NETWORKING

FIELD OF THE INVENTION

This patent specification relates to the field of networking. More specifically, this patent specification relates to systems and methods for securely authenticating and providing IP over Ethernet network access to wired or wireless subscribers using bare metal switches and software defined networking techniques.

BACKGROUND

Providing broadband internet service gets changed every few years based on changes in physical layer technologies. There are many different connectivity media available such as xDSL (ADSL, ADSL2, etc.) DOCSIS, Fiber, Ethernet, and Wireless. In the last few years, the industry has been moving towards making Ethernet as a common standard for connectivity.

Internet service providers (ISPs) have been using overlay and encapsulation models such as Point-to-Point Protocol over Ethernet (PPPOE) for many years. The PPPOE specification provides a logical tunnel which is established between the CPE (customer perimeter equipment) and a network device of the ISP referred to as broadband network gateway (BNG) or remote access server (RAS). The BNG and RAS are expensive equipment and eventually become a bottleneck in the network, as all user traffic is required to pass through them. Additionally, they have following caveats: being complex; acting as a single point of failure; functioning as a bottle neck; and tied control and data plane. A further drawback is that each BNG can only support a certain number of subscribers resulting in the need for an ISP to procure and develop more BNG devices to accommodate an expanding the subscriber base. In addition, these networks are unable to accommodate a wide range of CPE devices resulting in the need for ISPs to procure and provide CPE devices to their subscribers, which is another cost factor especially when the connection medium is just Ethernet or IPoE.

Therefore, a need exists for novel computer-implemented systems and methods that are configured to provide authentication and to provide IPoE network access. A further need exists for novel computer-implemented networking systems and methods that provide a scalable solution for centrally managing and securing the entire subscriber transit network. There is also a need for novel computer-implemented networking systems and methods that are configured to eliminate the need for BNG or RAS as PPPoE Servers and to disaggregate control and data plane. Finally, a need exists for novel computer-implemented networking systems and methods which provide cost reduction by allowing subscribers to use their own CPE.

BRIEF SUMMARY OF THE INVENTION

A computer-implemented system and methods for authenticating and providing IPoE network access are provided. The system and methods utilize Software-defined networking (SDN) and bare metal switches to provide a new flexible, cost effective solution to replace broadband network gateway (BNG) or remote access server (RAS) technology. The provided system and method enables networks which completely remove the RAS and BNG and eliminating the use of PPPOx. Additionally, the system and method enabling the consumer perimeter equipment (CPE) devices to simply use pure IP or IPOE. This solution can also provide the following additional features comparing to a pure RAS/BNG technology: allow pure IP connectivity without change in MTU (maximum message size); dynamically allow burst for subscribers based on real-time network bandwidth capacity; allow usage of subscriber's own CPE device or even a personal computer (PC) instead of requiring the use of ISP provided CPE devices to subscribers; allow direct connection of devices that don't support PPPOx such as SmallCell or Femtocells; allow service providers to create time driven policies for clients, for example automatically increase, decrease bandwidth based on time of the day; and eliminate the service provider need to manually configure the transit L2 or L3 switches.

According to one embodiment consistent with the principles of the invention, a computer implemented system for providing IPoE network access using software defined networking is provided. In some embodiments, the system may include one or more: consumer perimeter equipment (CPE) devices; layer 2 non-channelized media that may be a programmable transit switch in communication with the CPE device; and layer 3 non-channelized media that may be a programmable transit switch in communication with the layer 2 non-channelized media comprising a programmable transit switch. A Subscriber Controller Server may be in communication with the layer 3 non-channelized media comprising a programmable transit switch. The Subscriber Controller Server may include a processor, a memory in communication with the processor, and enrollment logic stored in the memory, executable by the processor and configured to authenticate the CPE device via an enrollment request received from the CPE device; and programming logic stored in the memory, executable by the processor and configured to program the layer 2 programmable transit switch to map the MAC address of the CPE device to a port of the layer 2 programmable transit switch, and configured to program the layer 3 programmable transit switch to map the MAC address of the CPE to the IP address of the CPE device.

According to another embodiment consistent with the principles of the invention, a computer implemented method for providing IPoE network access using software defined networking is provided. In some embodiments, the method may include the steps of: receiving an enrollment request, the enrollment request having a Media Access Control (MAC) address and an Internet Protocol (IP) address, from a consumer perimeter equipment (CPE) device via layer 2 non-channelized media comprising a programmable transit switch and via layer 3 non-channelized media comprising a programmable transit switch; authenticating the CPE device; programming the layer 2 programmable transit switch to map the MAC address of the CPE device to a port of the layer 2 programmable transit switch; and programming the layer 3 programmable transit switch to map the MAC address of the CPE to the IP address of the CPE device.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
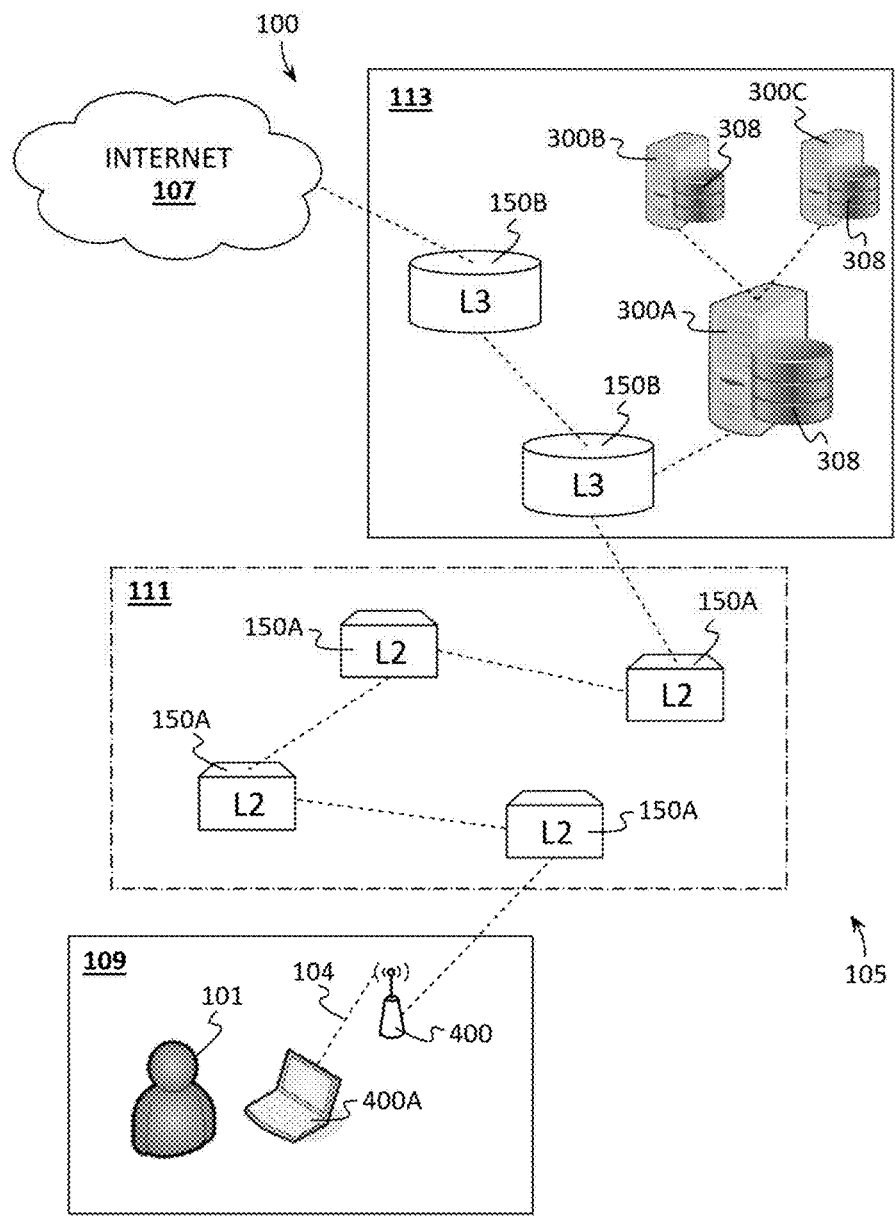
FIG. 1 depicts an illustrative example of some of the components and computer implemented methods which may be found in a system for providing IPoE network access using software defined networking according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

DEFINITIONS

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "client device" as used herein is a type of computer comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "customer premises equipment" or "customer perimeter equipment" (CPE device) as used herein may be any type of electronic device or client device which may include any terminal and associated equipment located at a subscriber's premises and connected with a carrier's telecommunication channel at the demarcation point ("demarc"). The demarc is a point established in a building or complex to separate customer equipment from the equipment located in either the distribution infrastructure or central office of the communications service provider. CPE device generally refers to devices such as telephones, routers, switches, residential gateways (RG), set-top boxes, fixed mobile convergence products, home networking adapters and Internet access gateways that enable consumers to access communications service providers' services and distribute them around their house via a local area network (LAN). A CPE device can be an active equipment, as the ones mentioned above or a passive equipment such as analogue-telephone-adapters or xDSL-splitters.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital files, images, videos, account information, user profile information, and/or any other type of information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for securely authenticating and providing IP over Ethernet network access to wired or wireless subscribers using bare metal switches and software defined networking techniques are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system for providing IP Over Ethernet (IPoE) network access using software defined networking ("the system") 100 according to some embodiments is presented. Preferably, the system 100 may be used to provide IPoE network access for subscribers, via their respective consumer perimeter equipment (CPE) devices 400, connected through a software defined network service provider over non-channelized media. The system 100 is configured to facilitate the transfer of data and information between one or more access points 103, consumer perimeter equipment (CPE) devices 400, and servers 300A, 300B, 300C, over a data network 105. Each CPE device 400 may send data to and receive data from the data network 105 through a network connection 104 with an access point 103. Optionally, one or more client devices 400A may be in communication with the internet 107 via a CPE device 400. One or more data stores 308 may be accessible by the one or more servers 300, and each data store 308 may contain one or more databases.

In this example, the system 100 comprises at least one CPE device 400 (but preferably more than two CPE devices 400) configured to be operated by one or more users 101. CPE devices 400 can be routers, modems, mobile devices, such as laptops, tablet computers, personal digital assistants, smart phones, and the like, that are equipped with a network interface capable of sending data to one or more servers 300 with access to one or more data stores 308 over a network 105 such as a wireless local area network (WLAN). Additionally, CPE devices 400 can be fixed devices, such as desktops, workstations, and the like, that are equipped with a wireless or wired network interface capable of sending data to one or more servers 300A, 300B, 300C, with access to one or more data stores 308 over a wireless or wired local area network 105. The present invention may be implemented by at least one server 300A, 300B, 300C, programmed to perform one or more of the steps described herein. In some embodiments, more than one client device 400 and/or server 300A, 300B, 300C, may be used, with each being programmed to carry out one or more steps of a method or process described herein.

In some embodiments, the system 100 may comprise a CPE device 400 which may be located at a subscriber's or user's location 109. The CPE device 400 may be in communication with the internet 107 via a service provider transit network 111 and a service provider core 113. The CPE device 400 may be connected via Ethernet to service provider core 113 so that there may be a layer 2 and/or layer 3 internet protocol (IP) connectivity between CPE device 400 and the service provider core 113 of the internet service provider (ISP). The service provider transit network 111 may comprise non-channelized media formed by one or more layer 2 programmable transit switches 150A. The service provider transit network 111 may be in communication with the service provider core 113 which may comprise non-channelized media formed by one or more layer 3 programmable transit switches 150B. A subscriber controller server 300A may be in communication with a layer 3 programmable transit switch 150B, and the subscriber controller server 300A may be in communication with a Dynamic Host Configuration Protocol (DHCP) server 300B and an authentication, authorization, and accounting (AAA) server 300C.

The transit switches 150A, 150B, may be programmable via APIs provided by the respective silicon manufacturer of the transit switches 150A, 150B. The ISP may register the CPE devices 400 of their subscribers 101 in a database 330 of a data store 308. Multiple numbers of CPE devices 400 may be registered, preferably based on the media access control address (MAC) address of each CPE device 400 and DHCP fingerprinting which may include information on the type of device, manufacturer name, and OS of the device.

The CPE device 400 may provide an enrollment request to the service provider core 113. Preferably, the enrollment request comprises IP datagrams encapsulated in Ethernet frames. In some embodiments, the enrollment request may comprise DHCP discover packets optionally comprising a DHCP fingerprint. The DHCP packet may be forwarded via the layer 2 (L2) programmable transit switches 150A to the first layer 3 (L3) device, preferably a L3 programmable transit switch 150B, in the network 105. In other embodiments, the enrollment request may comprise a gratuitous ARP or an ARP request for default gateway. The ARP request or gratuitous ARP may be forwarded by the L2 programmable transit switches 150A, to the L3 device, preferably a L3 programmable transit switch 150B, in the network 105.

In either case of ARP or DHCP, the packet will reach to the first L3 programmable transit switch 150B. The L3 programmable transit switch 150B may be a bare metal switch which may be programmed via suitable application programming interfaces (APIs). The L3 table of the L3 programmable transit switch 150B is may be managed by the subscriber controller server (SCS) 300A. In embodiments in which the packet was a DHCP request, the L3 programmable transit switch 150B will forward the packet to the SCS 300A as a standard DHCP helper (RFC 1541, 1542). In embodiments in which an ARP request was sent, the L3 programmable transit switch 150B may look in its L3 table to reply the CPE device 400. If the static ARP entry exists in the L3 table of the SCS 300A, from a previous session, then it will reply. However, since the L3 programmable transit switch 150B doesn't have entry for the source in its ARP table it will not reply the packet.

The DHCP request may reach the SCS 300A. The SCS 300A may be in communication with a DHCP server 300B and an AAA server 300C. The SCS 300A may query the AAA server 300C for authentication of the CPE device 400 with parameters extracted from the DHCP request packet which may include the MAC address and DHCP fingerprint of the CPE device 400. The AAA server 300C may search a database 330 to find if the MAC address and DHCP fingerprint match a subscriber account or record that is authorized to access the network 105. Preferably, if the parameters match a subscriber account or record that is authorized to access the network 105, the SCS 300A may perform one or more functions which include: program the programmable transit switches 150A, 150B, in the path with flow of the CPE device 400; inject a L3 entry in first L3 programmable transit switch 150B to map the MAC address of the CPE device 400 to the IP address it allocated; sends a DHCP offer to the CPE device 400; and/or inject one or more quality of service (QoS) parameters such as bandwidth ingress and egress allowances for the CPE device 400.

Figure 2:
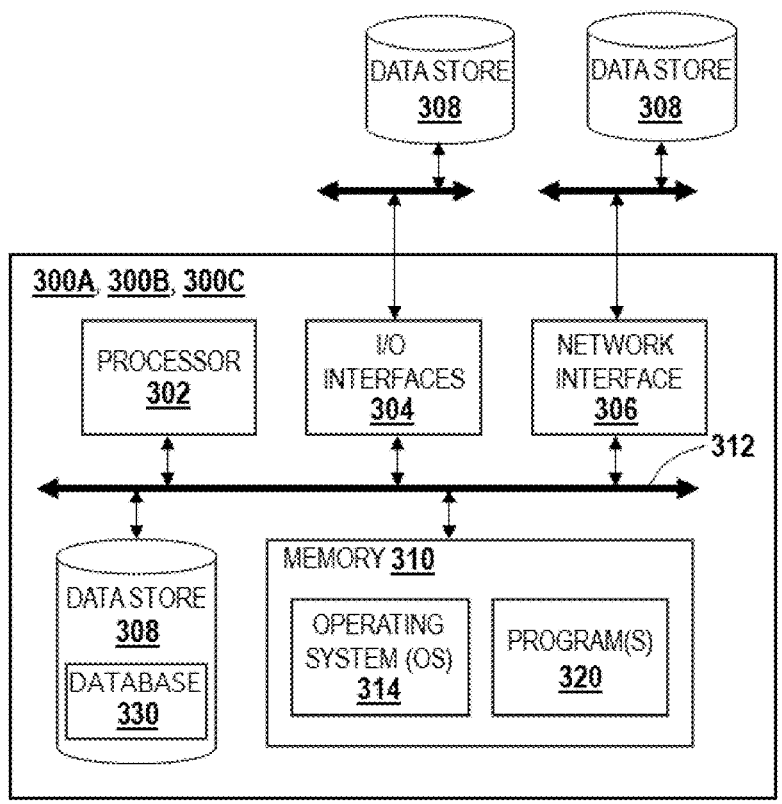
FIG. 2 illustrates a block diagram showing an example of a server which may be used by the system as described in various embodiments herein.

Referring now to FIG. 2, in an exemplary embodiment, a block diagram illustrates a subscriber controller server 300A, a DHCP server 300B, or an AAA server 300C of which one or more may be used in the system 100 or standalone and which may be a type of computing platform. A server 300A, 300B, 300C, may be a digital computing device that, in terms of hardware architecture, generally includes a processor 302, input/output (I/O) interfaces 304, a network interface 306, a data store 308, and memory 310. It should be appreciated by those of ordinary skill in the art that FIG. 2 depicts a server 300A, 300B, 300C, in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300A, 300B, 300C, a semiconductor-based microprocessor (in the form of a microchip or chip set), or generally any device for executing software instructions. When a server 300A, 300B, 300C, is in operation, the processor 302 is configured to execute software stored within the memory 310, to communicate data to and from the memory 310, and to generally control operations of the server 300A, 300B, 300C, pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300A, 300B, 300C, to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data preferably in one or more databases 330.

The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300A, 300B, 300C, such as, for example, an internal hard drive connected to the local interface 312 in the server 300A, 300B, 300C. Additionally in another embodiment, the data store 308 may be located external to the server 300A, 300B, 300C, such as, for example, an external hard drive connected to the I/O interfaces 304 (e.g., SCSI or USB connection). In a further embodiment, the data store 308 may be connected to the server 300A, 300B, 300C, through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

In some embodiments, the programs 320 of a subscriber controller server 300A may comprise programming logic which may enable the SCS 300A to it dynamically program the fabric (formed by programmable transit switches 150A, 150B, in the path) via OpenFlow or other supported APIs to allow forwarding traffic of CPE devices 400. Preferably, the SCS 300A may control and manage the programmable transit switches 150A, 150B, via API calls. The programmable transit switches 150A, 150B, may include software which may run on top of Linux OS running on bare metal type programmable transit switches 150A, 150B. This software may use the SDK of the switch silicon to program the switch silicon hardware tables. The programming logic of the SCS 300A may inject an L3 entry in first layer 3 programmable transit switch 150B (L3 network device) in the path (from CPE device 400 perspective) to map the MAC address of the CPE device 400 to the IP address that is allocated for CPE device 400. Optionally, the programming logic of the SCS 300A may inject an L2 entry in first layer 2 programmable transit switch 150A (L2 network device) in the path (from CPE device 400 perspective) to map the MAC address of the CPE device 400 to a network interface 152 port of the layer 2 programmable transit switch 150A. In further embodiments, the programming logic of the SCS 300A may enable the SCS 300A to work with different network switches by loading a software driver plug-in for the respective switches. The functions performed by the SCS 300A enable the system 100 to be different from current IPOE and ISP subscriber solutions as it decouples the control and hardware. In most existing solutions, the function of a SCS 300A is limited to authentication or creation of a encapsulated PPPOE tunnel which has lots of overhead and most importantly they are not capable of programming the switching network. In still further embodiments, the programming logic of the SCS 300A may enable the SCS 300A to inject or program a programmable transit switch 150A, 150B, with QoS (Quality of Services) parameters on ingress and egress of each CPE device 400. These QoS parameters may be used to specify the bandwidth utilization or limits of a subscriber CPE 400, for example limited at 2 Mbps or 10 Mbps. Preferably, the programming logic may be configured to program a programmable transit switch 150A, 150B, with bandwidth limits for a CPE device 400 based on current system load or traffic. In still further embodiments, the programming logic may be configured to provide analytics information to other applications via API and/or to provide API support to other applications in order to support automation. In even further embodiments, the programming logic may be configured to support different types of switches (which may not be bare metal switches) via protocol drivers. In even further embodiments, the programming logic may be configured to support wireless access points.

In some embodiments, the programs 320 of a DHCP server 300B may comprise enrollment logic which may enable the DHCP server 300B to function as a client/server protocol that automatically provides an Internet Protocol (IP) host with its IP address and other related configuration information such as the subnet mask and default gateway.

In some embodiments, the programs 320 of a AAA server 300C may comprise enrollment logic which may enable the AAA server 300C to function as a server program that handles user requests for access to computer resources and, for an enterprise, provides authentication, authorization, and accounting (AAA) services.

In some embodiments, the programs 320 of a subscriber controller server 300A may comprise enrollment logic which may enable the SCS 300A to authenticate a CPE device 400 via an enrollment request received from the CPE device 400. The enrollment logic may query the AAA server 300C for authentication of the CPE device 400 with parameters extracted from the DHCP request packet which may include the MAC address and DHCP fingerprint of the CPE device 400. The AAA server 300C may search a database 330 to find if the MAC address and DHCP fingerprint match a subscriber account or record that is authorized to access the network 105. Preferably, if the parameters match a subscriber account or record that is authorized to access the network 105, the enrollment logic may provide Dynamic Host Configuration Protocol (DHCP) offer to the CPE device, optionally via the programming logic. Additionally, if the parameters match a subscriber account or record that is authorized to access the network 105, the enrollment logic may allow or direct the programming logic to perform one or more functions which include: program the programmable transit switches 150A, 150B, in the path with flow of the CPE device 400; inject a L3 entry in first L3 programmable transit switch 150B to map the MAC address of the CPE device 400 to the IP address it allocated; and/or inject one or more quality of service (QoS) parameters such as bandwidth ingress and egress allowances for the CPE device 400.

Figure 3:
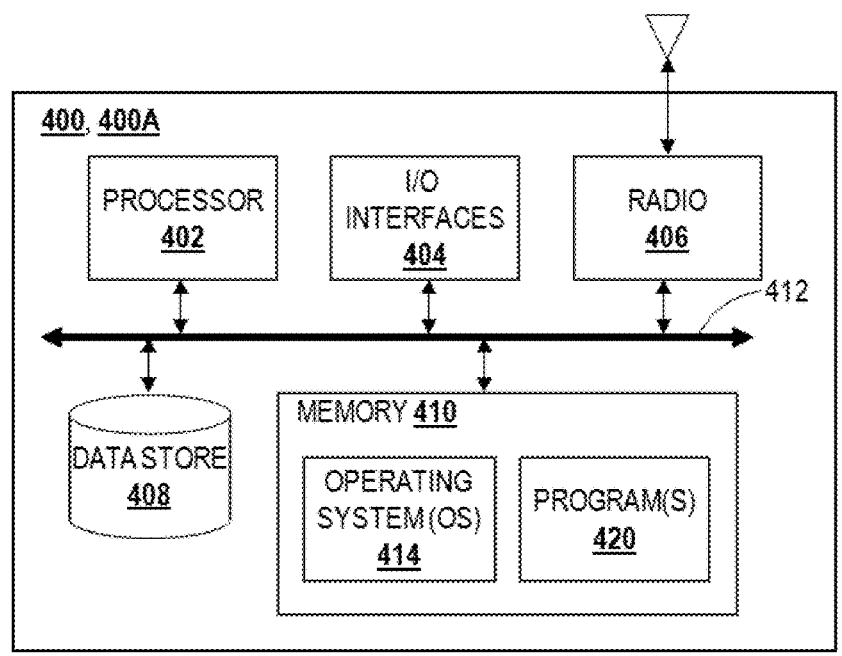
FIG. 3 shows a block diagram illustrating an example of a client device which may be used by the system as described in various embodiments herein.

Referring to FIG. 3, in an exemplary embodiment, a block diagram illustrates an electronic device, such as a CPE device 400 or a client device 400A, of which one or more may be used in the system 100 or the like and which may be a type of computing platform. The electronic device 400, 400A, can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts an electronic device 400, 400A, in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the electronic device 400, 400A, is in operation, the processor 402 is configured to execute software stored within the memory 410, to communicate data to and from the memory 410, and to generally control operations of the electronic device 400, 400A, pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The network interface 406 enables communication to an external access device or network. The network interface 406 may optionally include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. The network interface 406 may optionally be configured to use any number of suitable wireless data communication protocols, techniques, or methodologies can be supported by the network interface 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like.

Exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
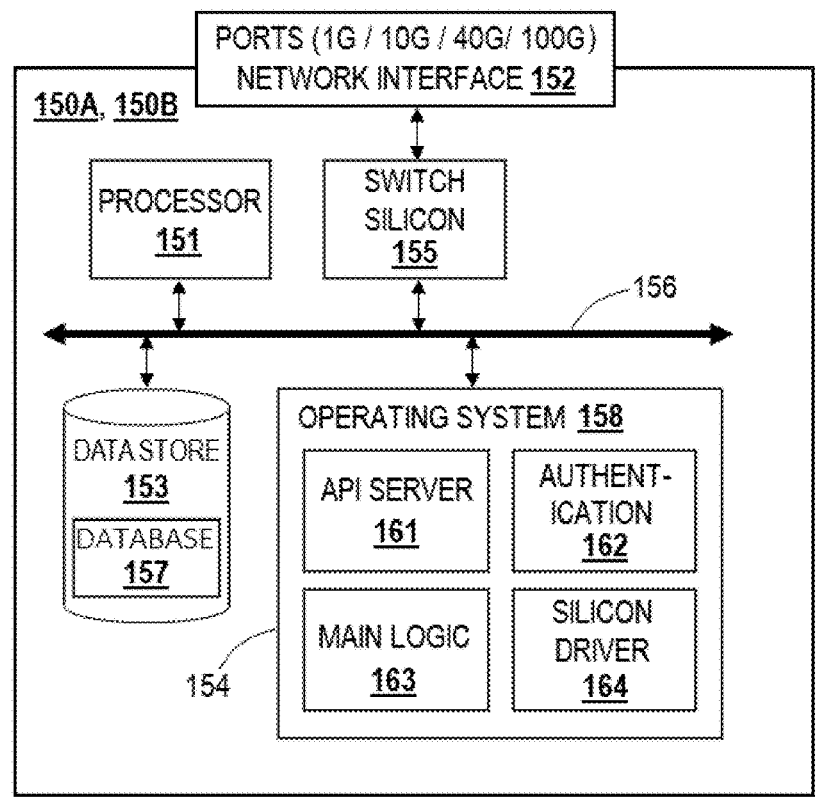
FIG. 4 depicts a block diagram illustrating an example of a programmable transit switch which may be used by the system as described in various embodiments herein.

Referring now to FIG. 4, a block diagram depicts an example of a programmable transit switch 150A, 150B, of which one or more may be used in the system 100. In preferred embodiments, a programmable transit switch 150A, 150B, may comprise a bare metal switch. Bare metal switches are produced by companies such as Edge-Core, Quanta, Penguin, etc. they are a type of switch hardware typically without any software. By installing a NOS (Network operating system) on a bare metal switch it becomes a functional device capable of operating as a programmable transit switch 150A, 150B. A SCS 300A may communicate with software component running on bare metal switches to control and program them dynamically. However, the SCS 300A is not limited to use with bare metal switches and API communication. The SCS 300A may work with other types of switches and other protocols such as NETCONF and OpenFLow.

A programmable transit switch 150A, 150B, may be a digital computing device that, in terms of hardware architecture, generally includes a processor 151, network interface(s) 152, a data store 153, memory 154, and silicone switches 155. It should be appreciated by those of ordinary skill in the art that FIG. 4 depicts a programmable transit switch 150A, 150B, in an oversimplified manner, and a practical embodiment may include additional components and suitably configured processing logic to support known or conventional operating features that are not described in detail herein. The components (151, 152, 153, 154, and 155) are communicatively coupled via a local interface 156. The local interface 156 may be, for example but not limited to, one or more buses or other wired or wireless connections, as is known in the art such as Peripheral Component Interconnect Express (PCIe). The local interface 156 may have additional elements, which are omitted for simplicity, such as controllers, buffers (caches), drivers, repeaters, and receivers, among many others, to enable communications. Further, the local interface 156 may include address, control, and/or data connections to enable appropriate communications among the aforementioned components.

The processor 151 is a hardware device for executing software instructions. The processor 151 may be any custom made or commercially available processor, a central processing unit (CPU), an auxiliary processor among several processors associated with the programmable transit switch 150A, 150B, a semiconductor-based microprocessor (in the form of a microchip or chip set), or generally any device for executing software instructions. When a programmable transit switch 150A, 150B, is in operation, the processor 151 is configured to execute software logic stored within the memory 154, to communicate data to and from the memory 154, and to generally control operations of the programmable transit switch 150A, 150B, pursuant to the software instructions.

The network interfaces 152 may comprise one or more ports to be used to enable the programmable transit switch 150A, 150B, to communicate on a network, such as the Internet, the data network 105, the enterprise, and the like, etc. The network interface 152 ports may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 152 may include address, control, and/or data connections to enable appropriate communications on the network.

A data store 153 may be used to store data preferably in one or more databases 157. The data store 153 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 153 may incorporate electronic, magnetic, optical, and/or other types of storage media. The data store 153 may be located internal, external, or otherwise connected to the programmable transit switch 150A, 150B.

The memory 154 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 154 may incorporate electronic, magnetic, optical, and/or other types of storage media. Note that the memory 154 may have a distributed architecture, where various components are situated remotely from one another, but can be accessed by the processor 151. The software in memory 154 may include an operating (O/S) system 158 and one or more software programs, each of which includes an ordered listing of executable instructions for implementing logical functions. The software in the memory 154 may include API server logic 161, authentication logic 162, main logic 163, and silicone driver logic 164. The software in the memory 154 may include logic for enabling the programmable transit switch 150A, 150B, to communicate with the SCS 300A via APIs.

In some embodiments, a programmable transit switch may be configured to function as a layer 2 programmable transit switch 150A and one or more layer 2 programmable transit switches 150A may be used to form a Layer 2 network. Preferably, the layer 2 programmable transit switches 150A may each comprise a bare metal switch. The layer 2 switching may occur in switch silicon 155 of a layer 2 programmable transit switch 150A bare metal switch. The layer 2 programmable transit switch 150A may comprise a Layer 2 table or database 157 which maps the MAC addresses to a port of a network interface 152. Layer 2 switch logic within the bare metal switch silicon looks at the Layer 2 table (AKA CAM table, MAC-Address Table, forwarding table) to find where it needs to send a recently arrived packet (a Layer 2 frame). Information within the Layer 2 table of the database 157, tells the silicon to send the frame out of which port of a network interface 152 (the physical 1G/10G/40G/100G ports in front of switch). The SCS 300A is able to dynamically influence and program this Layer 2 table within the layer 2 programmable transit switch 150A. Preferably, this enables the SCS 300A to have full control over the network and can stop a specific CPE device 400 of a subscriber 101 immediately if there is a security issue or any other alarm. Also in preferred embodiments, the SCS 300A can influence changes on layer 2 programmable transit switch 150A frame which means that it can tell the switch silicon of the layer 2 programmable transit switch 150A to amend the original Layer 2 frame prior to sending it out, such as adding VLAN tags, COS (Class of service), etc.

In some embodiments, a programmable transit switch may be configured to function as a layer 3 programmable transit switch 150B and one or more layer 3 programmable transit switches 150B may be used to form a Layer 3 network. Preferably, the layer 3 programmable transit switches 150B may each comprise a bare metal switch. In a typical service provider network 105, the transit network is mainly designed by layer 2 switches without layer 3 capabilities. This means that from the perspective of a subscriber CPE device 400, when a packet is sent, it is being forwarded as it is towards the default gateway(s) (layer 3 device) which might be miles away, connected via multiple Layer 2 or Layer 2 wireless backhauls to the network 105.

The layer 3 programmable transit switch 150B may be configured to act as a default gateway for subscriber CPE devices 400. The layer 3 programmable transit switch 150B may receive the packets from each subscriber CPE device 400 and routes them to upstream routers. Layer 3 switching is similar to Layer 2 switching. It is based on table look ups within the switch silicon. The layer 2 switching is based on lookup at Layer 2 CAM/MAC tables, however the Layer 3 switching is similarly based on lookups at Layer 3 routing information tables stored on or accessible to the layer 3 programmable transit switch 150B. The SCS 300A may program the Layer 3 forwarding tables of the layer 3 programmable transit switch(s) 150B in order to control and allow the CPE device(s) 400 to access the network 105. Upon initial connection, when a CPE device 400 starts sending DHCP packets, the SCS 300A may inject an entry to the layer 3 programmable transit switch 150B to map the MAC address of the CPE device 400 to its allocated IP address. This is very useful to secure and control the network 105 to ensure the MAC and IP address of the CPE device 400 are linked. The layer 3 programmable transit switch 150B may reply to the ARP requests coming from a CPE device 400 only after such entries has been programmed in its Layer 3 forwarding tables by the SCS 300A.

Figure 5:
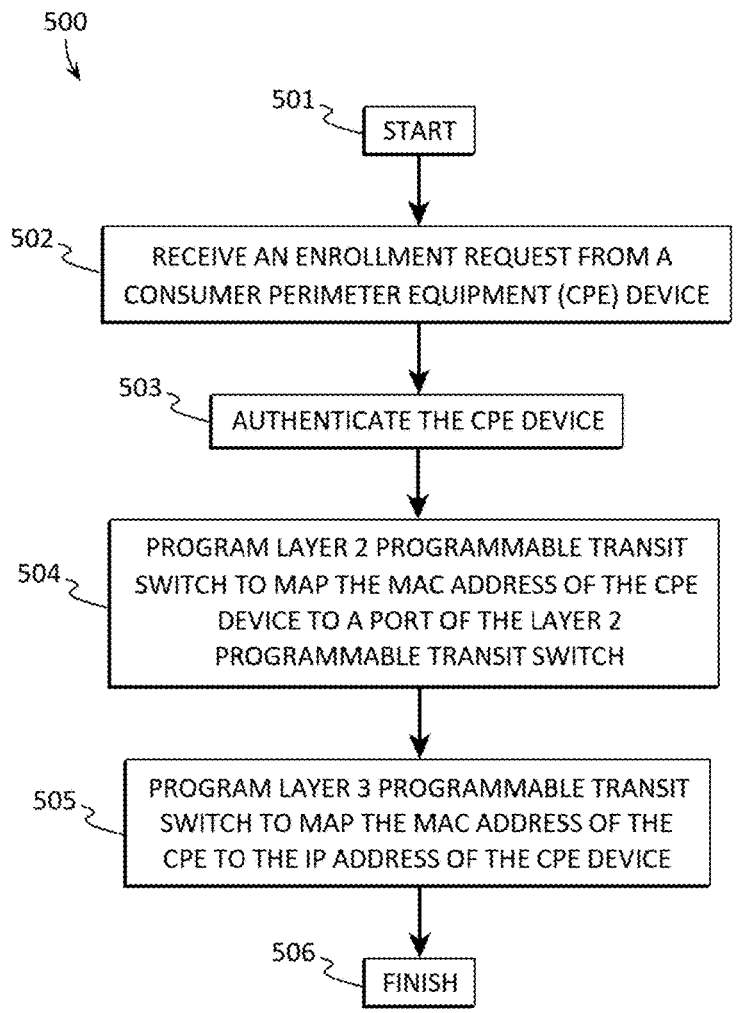
FIG. 5 illustrates a block diagram of an example of a computer-implemented method for providing IPoE network access using software defined networking according to various embodiments described herein.

A block diagram of an example of a method for providing IPoE network access using software defined networking ("the method") 500 according to various embodiments described herein is shown as an overview in FIG. 5. The method 500 may be used for providing IP Over Ethernet (IPoE) network access for subscribers connected through a software defined network service provider over non-channelized media. The method 500 may start 501 and an enrollment request may be received from a consumer perimeter equipment (CPE) device 400 of a subscriber 101 in step 502. In some embodiments, the enrollment request may have a Media Access Control (MAC) address and an Internet Protocol (IP) address, and the enrollment request may be received by a SCS 300A via layer 2 non-channelized media comprising a programmable transit switch 150A and via layer 3 non-channelized media comprising a programmable transit switch 150B.

In step 503, the CPE device 400 may be authenticated. In some embodiments, the enrollment logic may query the AAA server 300C for authentication of the CPE device 400 with parameters extracted from the DHCP request packet which may include the MAC address and DHCP fingerprint of the CPE device 400. The AAA server 300C may search a database 330 to find if the MAC address and DHCP fingerprint match a subscriber account or data record, the data record comprising the DHCP fingerprint and the MAC address of the CPE device 400, that is authorized to access the network 105. If the parameters match a subscriber account or data record that is authorized to access the network 105, the enrollment logic may authenticate the CPE device 400.

In step 504, the programming logic of the SCS 300A may program layer 2 programmable transit switch(s) 150A to map the MAC address of the CPE device 400 to a network interface 152 port of the layer 2 programmable transit switch 150A. In some embodiments, the programming logic of the SCS 300A may inject an L2 entry in first layer 2 programmable transit switch 150A (L2 network device) in the path (from CPE device 400 perspective) to map the MAC address of the CPE device 400 to a network interface 152 port of the layer 2 programmable transit switch 150A.

In step 505, the programming logic of the SCS 300A may program layer 3 programmable transit switch(s) to map the MAC address of the CPE device 400 to the IP address of the CPE device 400. In some embodiments, the programming logic of the SCS 300A may inject an L3 entry in first layer 3 programmable transit switch 150B (L3 network device) in the path (from CPE device 400 perspective) to map the MAC address of the CPE device 400 to the IP address that is allocated for CPE device 400. After step 505 and/or 504, the method 500 may finish 506.

Figure 6:
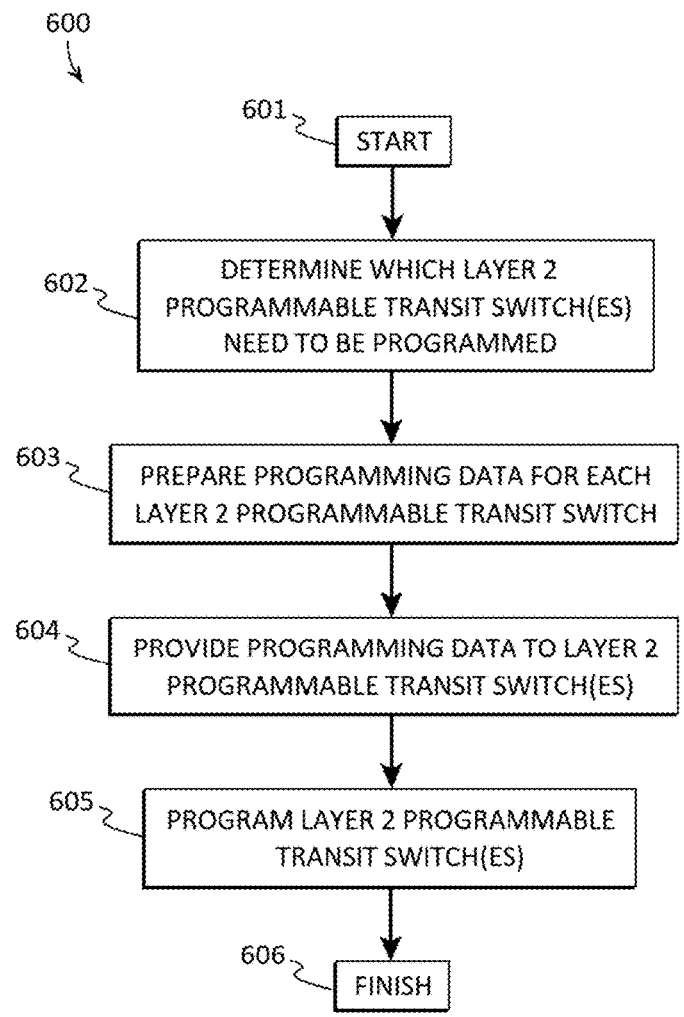
FIG. 6 shows a block diagram of an example of a computer-implemented method of using direct fabric programming and software defined networking to manage the forwarding tables of a service provider Layer 2 transit network according to various embodiments described herein.

FIG. 6 depicts an example method of using direct fabric programming and software defined networking (SDN) to manage the forwarding tables of a service provider Layer 2 transit network ("the method") 600 according to various embodiments described herein. The method 600 may start 601 and which layer 2 programmable transit switches 150A in the network 105 need to be programmed may be determined in step 602. In some embodiments, the programming logic of the SCS 300A may refer to a database, such as its internal database 330, to find which layer 2 programmable transit switches 150A in the path of the CPE device 400 need to be programmed to map the MAC address of the CPE device 400 to a port of a layer 2 programmable transit switch 150A.

In step 603, programming data for each layer 2 programmable transit switch 150A which is to be programmed may be prepared, preferably by referencing one or more databases 330. In some embodiments, the programming logic of the SCS 300A may prepare the programming data which may include: IP address of each layer 2 programmable transit switch(es) 150A; the uplink port[s] of each of the layer 2 programmable transit switch(es) 150A (towards the core); the downlink port of each of the layer 2 programmable transit switch(es) 150A (towards CPE device 400); the QoS parameters for the CPE device 400, such as bandwidth limits; and the authentication key required or used by the each of the layer 2 programmable transit switch(es) 150A in order for programming to occur.

In step 604, the programming data may be provided to the one or more layer 2 programmable transit switches 150A by the programming logic of the SCS 300A via the network 105.

Next, in step 605, the one or more layer 2 programmable transit switches 150A may be programmed. In some embodiments, a layer 2 programmable transit switch 150A in the path receives this API call from SCS 300A and performs the following: authenticate the request against the authentication key and stored authentication details; API server logic 161 calls the relevant function in main logic 163 of application; main logic 163 parse the request and creates an API call to switch silicon driver logic 164 to modify the Layer 2 table of the switch 150A (the parameters may include the MAC address of CPE device, the uplink and downlink ports, and QoS parameters); and an application running at the switch 150A may inform back the SCS 300A about the result of the programming operation. After step 605, the method 600 may finish 606.

Figure 7:
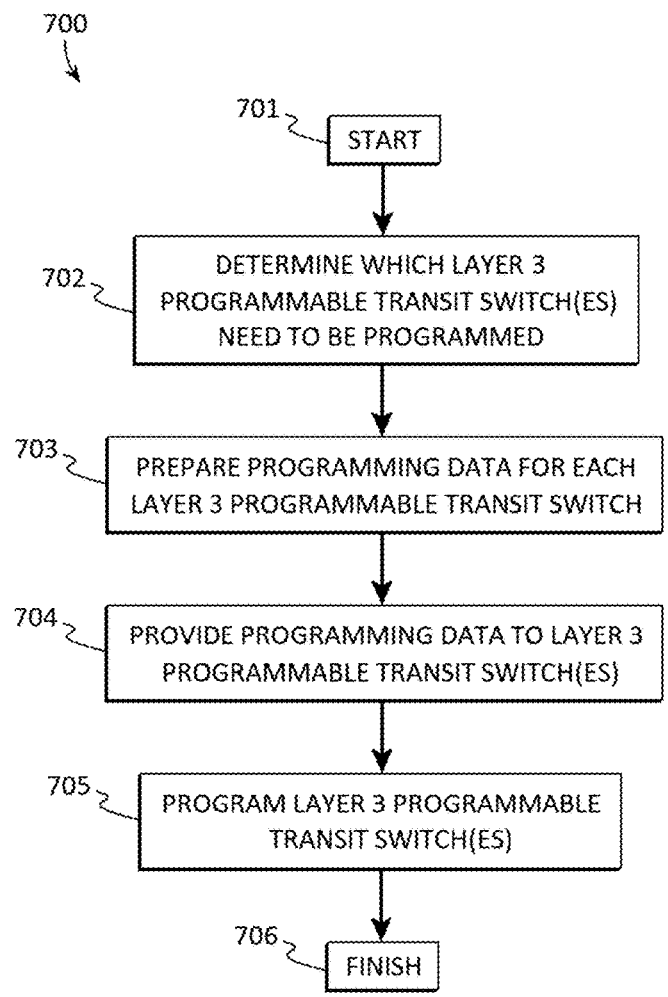
FIG. 7 depicts a block diagram of an example of a computer-implemented method of using direct fabric programming and software defined networking to manage the Layer 3 tables of a service provider Layer 3 transit network according to various embodiments described herein.

FIG. 7 shows an example method of using direct fabric programming and software defined networking (SDN) to manage the Layer 3 tables of a service provider Layer 3 transit network ("the method") 700 according to various embodiments described herein. The method 700 may start 701 and which layer 3 programmable transit switches 150B in the network 105 need to be programmed may be determined in step 702. In some embodiments, the programming logic of the SCS 300A may refer to a database, such as its internal database 330, to find which layer 3 programmable transit switches 150B in the path of the CPE device 400 need to be programmed to map the MAC address of the CPE device 400 to the IP address of the CPE device 400.

In step 703, programming data for each layer 3 programmable transit switch 150B which is to be programmed maybe prepared, preferably by referencing one or more databases 330. The programming logic of the SCS 300A may prepare the programming data which may include: IP address of each layer 2 programmable transit switch(es) 150A; IP address of the CPE device 400; the MAC address of CPE device 400; optionally the QoS parameters for the CPE device 400, such as bandwidth limits; and the authentication key required or used by the each of the layer 3 programmable transit switch(es) 150B in order for programming to occur.

In step 704, the programming data may be provided to the one or more layer 3 programmable transit switches 150B by the programming logic of the SCS 300A via the network 105.

Next, in step 705, the one or more layer 3 programmable transit switches 150A may be programmed. In some embodiments, a layer 3 programmable transit switch 150B in the path receives this API call from SCS 300A and performs the following: authenticate the request against the authentication key and stored authentication details; API server logic 161 calls the relevant function in main logic 163 of application; main logic 163 parse the request and creates an API call to switch silicon driver logic 164 to modify the Layer 3 table of the switch 150A (the parameters may include the MAC address of CPE device, and QoS parameters); and an application running at the switch 150B may inform back the SCS 300A about the result of the programming operation. After step 705, the method 700 may finish 706.

Figure 8:
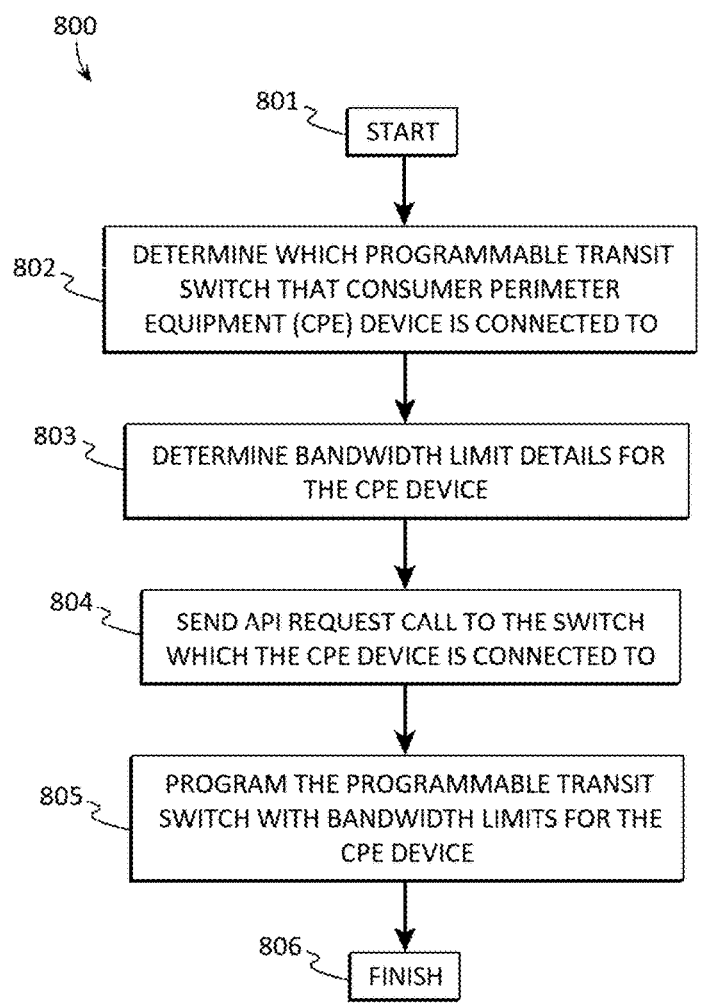
FIG. 8 illustrates a block diagram of an example of a computer-implemented method of using direct fabric programming and software defined networking to manage and apply QoS functions for one or more consumer perimeter equipment devices on different programmable transit switches within the network traffic path according to various embodiments described herein.

FIG. 8 illustrates an example method of using direct fabric programming and software defined networking (SDN) to manage and apply QoS functions for one or more CPE devices 400 on different programmable transit switches 150A, 150B, within the traffic path ("the method") 800 according to various embodiments described herein. In some embodiments, the method 800 may occur when the SCS 300A has authenticated a CPE device 400 and is going to program the layer 2 programmable transit switch 150A, to which the CPE device 400 is communicating to the network 105 with, for rate limiting and other QoS parameters. In other embodiments, the method 800 may be used to program a layer 3 programmable transit switch 150B to which the CPE device 400 is communicating to the network 105 with for rate limiting and other QoS parameters, such as when the layer 2 programmable transit switch 150A to which the CPE device 400 is communicating to the network 105 may not support or fully support rate limiting features or rate limiting programming.

The method 800 may start 801 and which programmable transit switch(es) 150A, 150B, that the CPE device 400 is connected to may be determined in step 802. In some embodiments, the programming logic of the SCS 300A may refer to a database, such as its internal database 330, to find a data record describing the Layer 2 programmable transit switch 150A, 150B, which the CPE device 400 is connected to.

In step 803, the bandwidth limit details and any other QoS parameters for the CPE device 400 may be determined. In some embodiments, the programming logic of the SCS 300A may refer to a database, such as its internal database 330, to find a data record describing the bandwidth limit details and any other QoS parameters for that CPE device 400 and fetches the bandwidth limit details and any other QoS parameters for that CPE device 400 of the subscriber 101.

In step 804, an API request call may be sent to the programmable transit switches 150A, 150B, which the CPE device 400 is connected to. In some embodiments, the programming logic of the SCS 300A may send the API request call, comprising the bandwidth limit details and any other QoS parameters, to the last programmable transit switch 150A, 150B, in the network that is able to be programmed with bandwidth limit details and any other QoS parameters for that CPE device 400 of the subscriber 101. The API request call may further comprise the authentication key required or used by the programmable transit switch 150A, 150B, in order for programming to occur.

In step 805, the programmable transit switch 150A, 150B, may be programmed with bandwidth limits or any other QoS parameter for the CPE device 400. In some embodiments, the programmable transit switch 150A, 150B, in the path receives this API call from SCS 300A and performs the following: authenticate the request against the authentication key and stored authentication details; API server logic 161 calls the relevant function in main logic 163 of application; main logic 163 parse the request and creates an API call to switch silicon driver logic 164 to modify bandwidth limiting setting for the specific network interface 152 port or gateway IP address; and an application running at the switch 150A, 150B, may inform back the SCS 300A about the result of the programming operation. After step 805, the method 800 may finish 806.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or WiFi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A system for providing IPoE network access using software defined networking, the system comprising:
   a. a consumer perimeter equipment (CPE) device;
   b. a layer 2 non-channelized media comprising a first programmable transit switch in communication with the CPE device and configured to provide network access to the CPE device only after (i) forwarding a DHCP discovery packet to a Subscriber Controller Server, (ii) receiving a remote API call from the Subscriber Controller Server, and (iii) dynamically programming a forwarding table to map a MAC address of the CPE device to a port based on instruction within the remote API call from the Subscriber Controller Server;

c. the Subscriber Controller Server in communication with the layer 2 non-channelized media comprising the first programmable transit switch, the Subscriber Controller Server having a processor, a memory in communication with the processor, and enrollment logic stored in the memory, executable by the processor and configured to authenticate the CPE device via an enrollment request received from the CPE device; and d. programming logic stored in the memory, executable by the processor and configured to remotely and dynamically program the forwarding table stored on the first programmable transit switch through the remote API call to map the MAC address of the CPE device to a port.

2. The system of claim 1, wherein the first programmable transit switch comprises a bare metal switch.

3. The system of claim 1, further comprising a second programmable transit switch wherein the second programmable transit switch comprises a bare metal switch.

4. The system of claim 1, wherein the programming logic is configured to remotely program the first programmable transit switch with bandwidth limits for the CPE device through the remote API call.

5. The system of claim 3, wherein the programming logic is configured to program the second programmable transit switch with bandwidth limits for the CPE device through a second remote API call.

6. The system of claim 1, wherein the programming logic of the Subscriber Contoller Server is configured to dynamically and remotely program the first programmable transit switch with bandwidth limits for the CPE device based on current system load.

7. The system of claim 1, wherein the enrollment request comprises a Dynamic Host Configuration Protocol (DHCP) fingerprint, the Dynamic Host Configuration Protocol (DHCP) fingerprint having data corresponding to at least one of; a device type, a manufacturer name, and an OS type of the CPE device, and wherein the CPE device is authenticated by matching both the DHCP fingerprint and the MAC address of the CPE device to a data record in a database, the data record having the DHCP fingerprint and the MAC address of the CPE device.

8. The system of claim 1, wherein the enrollment logic is configured to provide a Dynamic Host Configuration Protocol (DHCP) offer to the CPE device.

9. The system of claim 1, wherein the enrollment request comprises IP datagrams encapsulated in Ethernet frames.

10. The system of claim 1, wherein the enrollment request comprises Address Resolution Protocol (ARP).

11. A method for providing IPoE network access using software defined networking, the method comprising:

a. receiving an enrollment request, the enrollment request having a MAC address, from a consumer perimeter equipment (CPE) device via a layer 2 non-channelized media comprising a first bare metal programmable transit switch;

b. authenticating the CPE device remotely with a Subscriber Controller Server wherein the authentication involves matching both the MAC address and a DHCP fingerprint of the CPE device with a subscriber record accessible by the Subscriber Controller Server; and c. dynamically programming the first bare metal programmable transit switch to map the MAC address of the CPE device to a port by sending a remote API call from the Subscriber Controller Server to the first bare metal programmable transit switch.

12. The method of claim 11, wherein the DHCP fingerprint comprising data associated with at least one of; a device type, a manufacturer name, and an OS type of the CPE device.

13. The method of claim 11, further comprising a layer 3 programmable transit bare metal switch.

14. The method of claim 13, further comprising the step of: having the Subscriber Controller Server remotely programming the layer 3 programmable transit bare metal switch with bandwidth limits for the CPE.

15. The method of claim 11, further comprising the step of: having the Subscriber Controller Server remotely programming the first bare metal programmable transit switch with bandwidth limits for the CPE device through the remote API call.

16. The method of claim 11, further comprising the step of: transmitting to the CPE device a Dynamic Host Configuration Protocol (DHCP) offer.

17. The method of claim 11, wherein the enrollment request comprises IP datagrams encapsulated in Ethernet frames.

18. The method of claim 11, wherein the enrollment request comprises Address Resolution Protocol (ARP).

19. The method of claim 11, wherein the remote API call comprises a unique API key.

20. The method of claim 11, wherein the Subscriber Controller Server remotely determines bandwidth utilization for the CPE device, transmits a request through an API call to the first bare metal programmable transit switch, the API call having instructions for the first bare metal programmable transit switch to enforce bandwidth limits for the CPE device.

* * * * *